(12) United States Patent
Zhang et al.

(10) Patent No.: US 12,703,076 B2
(45) Date of Patent: Aug. 11, 2026

(54) ROTATING WHEEL APPARATUS, DRIVING WHEEL AND ROBOT

(71) Applicant: GOERTEK INC., Weifang (CN)

(72) Inventors: Xing Zhang, Weifang (CN); Chengkai Guo, Weifang (CN); Yuanjing Zheng, Weifang (CN); Jie Liu, Weifang (CN)

(73) Assignee: GOERTEK INC., Weifang (CN)

( * ) Notice: Subject to any disclaimer, the term of this patent is extended or adjusted under 35 U.S.C. 154(b) by 343 days.

(21) Appl. No.: 18/403,932

(22) Filed: Jan. 4, 2024

(65) Prior Publication Data

US 2024/0131684 A1 Apr. 25, 2024
US 2024/0227160 A9 Jul. 11, 2024

Related U.S. Application Data

(63) Continuation of application No. PCT/CN2021/120907, filed on Sep. 27, 2021.

(30) Foreign Application Priority Data

Jul. 27, 2021 (CN) ......................... 202110854153.2

(51) Int. Cl.
*B25J 5/00* (2006.01)
*F16C 35/067* (2006.01)

(52) U.S. Cl.
CPC ............. *B25J 5/007* (2013.01); *F16C 35/067* (2013.01)

(58) Field of Classification Search
CPC ......... B25J 5/007; F16C 35/067; F16C 19/06; B62D 57/02
See application file for complete search history.

(56) References Cited

U.S. PATENT DOCUMENTS 6,874,941 B2 * 4/2005 van Egeraat ......... A63C 17/223 301/5.307
2001/0029641 A1 * 10/2001 Uratani .................. A47L 9/009 15/327.4
2004/0182614 A1 9/2004 Wakui
(Continued)

FOREIGN PATENT DOCUMENTS

CN 1817580 A 8/2006
CN 101168372 A 4/2008
(Continued)

OTHER PUBLICATIONS

International Search Report and Written Opinion issued in International Patent Application No. PCT/CN2021/120907; mailed Apr. 25, 2022; 14 pgs.

(Continued)

*Primary Examiner* — George C Jin
(74) *Attorney, Agent, or Firm* — HAUPTMAN HAM, LLP

(57) ABSTRACT

Disclosed are a rotating wheel apparatus, a driving wheel and a robot. The rotating wheel apparatus includes: a rotating assembly, a bearing and a supporting base. The rotating assembly is provided with an accommodating groove. The bearing is accommodated in the accommodating groove and connected to the rotating assembly. The supporting base is close to a notch of the accommodating groove, the supporting base is connected to the bearing, so that the rotating assembly is rotationally connected to the supporting base.

13 Claims, 12 Drawing Sheets

(56) References Cited

U.S. PATENT DOCUMENTS

| | | | | |
|---|---|---|---|---|
| 2007/0056667 | A1* | 3/2007 | Worwag | A47L 9/009 152/212 |
| 2012/0314986 | A1* | 12/2012 | Bitzl | F16C 35/042 384/584 |
| 2017/0030405 | A1* | 2/2017 | Konishi | F16C 35/077 |
| 2021/0030245 | A1 | 2/2021 | Kim et al. | |
| 2023/0366433 | A1* | 11/2023 | Cardwell, III | F16C 25/083 |

FOREIGN PATENT DOCUMENTS

| | | | | |
|---|---|---|---|---|
| CN | 101278653 | A | 10/2008 | |
| CN | 102267505 | A | 12/2011 | |
| CN | 102745273 | A | 10/2012 | |
| CN | 103231746 | A | 8/2013 | |
| CN | 102602465 | B | 8/2016 | |
| CN | 109533238 | A | 3/2019 | |
| CN | 107499405 | B | 12/2023 | |
| JP | 2000218066 | A | 8/2000 | |
| WO | WO-2021003866 | A1 * | 1/2021 | B25J 17/00 |

OTHER PUBLICATIONS

Second Office Action in Corresponding Chinese Application No. 202110854153.2, dated Aug. 19, 2025; 18 pgs.
Third Office Action in Corresponding Chinese Application No. 202110854153.2, dated Nov. 11, 2025; 16 pgs.
First Office Action in Corresponding Chinese Application No. 202110854153.2, dated Mar. 18, 2025; 14 pgs.

* cited by examiner

ROTATING WHEEL APPARATUS, DRIVING WHEEL AND ROBOT

CROSS-REFERENCE TO RELATED APPLICATIONS

The present application is a continuation application of International Application No. PCT/CN2021/120907, filed on Sep. 27, 2021, which claims priority to Chinese Patent Application No. 202110854153.2, filed on Jul. 27, 2021. The disclosures of the above-mentioned applications are incorporated herein by reference in their entireties.

TECHNICAL FIELD

The present application relates to the technical field of robot, and in particular to a rotating wheel apparatus, a driving wheel and a robot.

BACKGROUND

With the progress of society and the development of network technology, more and more robot forms are produced. In recent years, spherical robots have attracted more and more attention. The spherical robots refer to the type of robot whose driving system is located inside the spherical housing (or the sphere) and realizes the movement of the sphere through internal drive. Since this type of robot has a good dynamic and static balance and good sealing, it can travel in harsh environments with no people, sand, dust, moisture, and corrosiveness, which can be used in planetary exploration, environmental monitoring, national defense equipment, entertainment and other fields.

In the spherical robot, two rotating wheels are connected through an intermediate connecting member, and the movement form, such as the linear motion, of the spherical robot is controlled by controlling the running speed of the two rotating wheels. In related art, the structural stability of the rotating wheel of the spherical robot is poor, which can easily lead to deviations in the motion trajectory of the spherical robot.

SUMMARY

The main objective of the present application is to provide a rotating wheel apparatus, a driving wheel and a robot, aiming to improve the stability of the rotating wheel.

In order to achieve the above objective, the rotating wheel apparatus provided in the present application includes: a rotating assembly, a bearing and a supporting base.

The rotating assembly is provided with an accommodating groove.

The bearing is accommodated in the accommodating groove and connected to the rotating assembly.

The supporting base is close to a notch of the accommodating groove, the supporting base is connected to the bearing, so that the rotating assembly is rotationally connected to the supporting base.

In an embodiment of the present application, the rotating assembly includes: a housing and a transmission member.

The housing is provided with the accommodating groove.

The transmission member is provided in the accommodating groove and located between the housing and the supporting base.

The transmission member is connected to the bearing, and the transmission member is detachably connected to the housing.

In an embodiment of the present application, the supporting base and the transmission member are respectively connected to both sides of the bearing, and a supporting portion is provided on one side of the supporting base facing the transmission member, an inner ring of the bearing is sleeved on the supporting portion, and the inner ring and the supporting portion are locked by a first locking member; and one side of the transmission member facing the supporting base is provided with a transmission portion, the transmission portion is sleeved on the outer ring of the bearing, and the outer ring and the transmission portion are locked by a second locking member.

In an embodiment of the present application, a first limiting portion is provided on an outer periphery of the supporting portion, and one side of the inner ring facing the supporting base is abutted against the first limiting portion; and the supporting portion is provided with a first mounting hole, one end of the first locking member is abutted against one side of the inner ring away from the first limiting portion and one side of the supporting portion facing the transmission member, the other end of the first locking member is inserted into the first mounting hole to lock the supporting portion and the inner ring.

In an embodiment of the present application, one side of the transmission portion facing the bearing is provided with a second limiting portion, and one side of the outer ring facing the transmission member is abutted against the second limiting portion; and the transmission portion is provided with a second mounting hole, one end of the second locking member is abutted against one side of the outer ring away from the second limiting portion and one side of the transmission portion facing the supporting base, and the other end of the second locking member is inserted in the second mounting hole to lock the transmission portion and the outer ring.

In an embodiment of the present application, a wall of the accommodating groove is provided with a hook, the hook and the wall of the accommodating groove are enclosed to form a limiting groove, and the transmission member is partially limited in the limiting groove.

In an embodiment of the present application, a clamping portion is provided on an outer periphery of the transmission member, the clamping portion is located in the limiting groove, one side of the clamping portion facing the housing is provided with an inclined surface, one side of the clamping portion away from the housing is abutted against the hook, and one side of the transmission member away from the supporting base is abutted against and fitted with the wall of the accommodating groove.

In an embodiment of the present application, the transmission member is provided with a plurality of positioning holes, the wall of the accommodating groove is provided with a plurality of positioning columns, and each of the positioning columns is inserted into the positioning hole.

In an embodiment of the present application, a third mounting hole is provided on an edge of the supporting base, and a projection of the transmission member on the supporting base is located on one side of the third mounting hole close to a center line of the supporting base.

In an embodiment of the present application, the supporting base is located in the accommodating groove, and the notch of the accommodating groove extends to one side of the supporting base away from the transmission member.

In an embodiment of the present application, the rotating assembly is further provided with a friction belt, an outer periphery of the rotating assembly is provided with a mounting groove, and the friction belt is provided in the mounting groove and partially extends out of the mounting groove.

In an embodiment of the present application, the rotating wheel apparatus further includes a counterweight provided on the supporting base.

The present application also provides a driving wheel, including: the rotating wheel apparatus and a driving member.

The supporting base of the rotating wheel apparatus is provided with a first assembly hole.

The driving member is provided in the first assembly hole, and an output end of the driving member is connected to the rotating assembly of the rotating wheel apparatus.

The present application also provides a robot, including: a main body and two driving wheels.

The main body provided with a control component.

The two driving wheels are respectively provided on opposite sides of the main body.

The driving member of the driving wheel is electrically connected to the control component.

The wall of the accommodating groove and the main body are enclosed to form an accommodation chamber, and the supporting base of the driving wheel is accommodated in the accommodation cavity and connected to the main body.

In the technical solutions of the present application, the supporting base can provide the stable support and can be used to connect to external structures. When the present application is applied to the robot, the supporting base can be connected to the main body of the robot. The supporting base is close to the notch of the accommodating groove, which can be easily connected to the external structure through the supporting base. In the present application, the rotating assembly is connected to the supporting base through the bearing to rotate. When rotating on the ground, the rotating assembly can push and drive the robot to move. The bearing can improve the stability of the rotating assembly, reduce the friction, and save the energy. The bearing is in the accommodating groove, and the rotating assembly can wrap and hide the bearing to protect the bearing. When the present application is applied to the robot, it can be ensured that only the rotating assembly is exposed and the other parts are hidden, providing the robot with the beautiful appearance. Meanwhile, the rotating assembly is connected to the supporting base through the bearing, which makes it convenient to assembly, improves the installation efficiency, and reduces the assembly difficulty.

BRIEF DESCRIPTION OF THE DRAWINGS

In order to illustrate the technical solutions in the embodiments of the present application or in the related art more clearly, the following briefly introduces the accompanying drawings required for the description of the embodiments or the related art. Obviously, the drawings in the following description are only part of embodiments of the present application. For those skilled in the art, other drawings can also be obtained according to the structures shown in these drawings without any creative effort.

The achievement of the purpose of the present application, functional characteristics and advantages will be further described with reference to the accompanying drawings in conjunction with embodiments.

DETAILED DESCRIPTION OF THE EMBODIMENTS

The technical solutions of the embodiments of the present application will be described in more detail below with reference to the accompanying drawings. It is obvious that the embodiments to be described are only some rather than all of the embodiments of the present application. All other embodiments obtained by those skilled in the art based on the embodiments of the present application without creative efforts shall fall within the scope of the present application.

It should be noted that if there are directional indications, such as up, down, left, right, front, back, etc, involved in the embodiments of the present application, the directional indications are only used to explain a certain posture as shown in the accompanying drawings. If the specific posture changes, the directional indication also changes accordingly.

In addition, if there are descriptions related to "first", "second", etc. in the embodiments of the present application, the descriptions of "first", "second", etc. are only for the purpose of description, and should not be construed as indicating or implying relative importance or implicitly indicates the number of technical features indicated. Thus, a feature delimited with "first", "second" may expressly or implicitly include at least one of that feature. In addition, the technical solutions between the various embodiments can be combined with each other, but must be based on the realization by those skilled in the art. When the combination of technical solutions is contradictory or cannot be realized, it should be considered that the combination of such technical solutions does not exist or fall within the scope of protection claimed in the present application.

The present application provides a rotating wheel apparatus 10.

Figure 1:
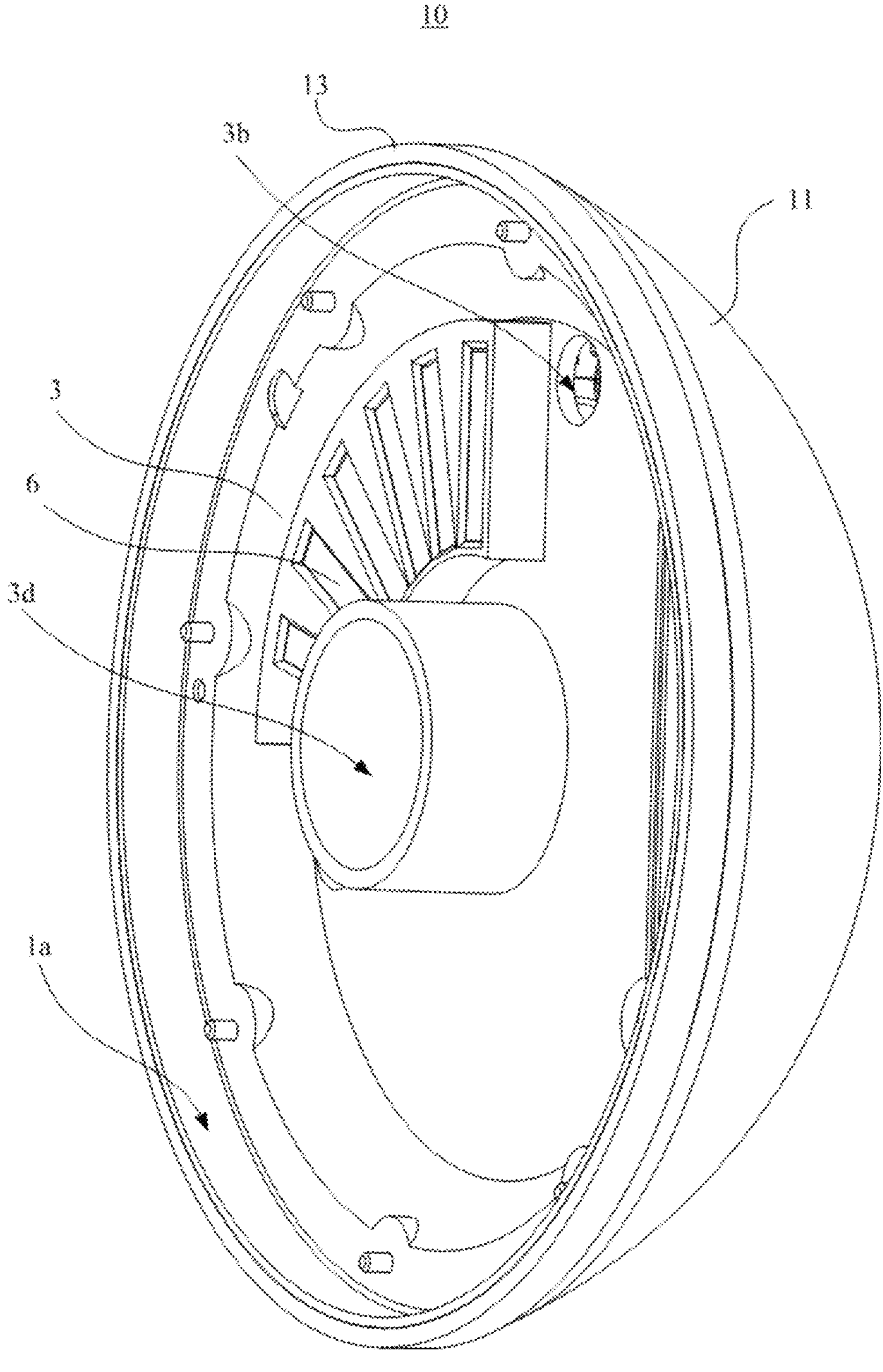
FIG. 1 is a schematic structural view of a rotating wheel apparatus according to an embodiment of the present application.
Figure 2:
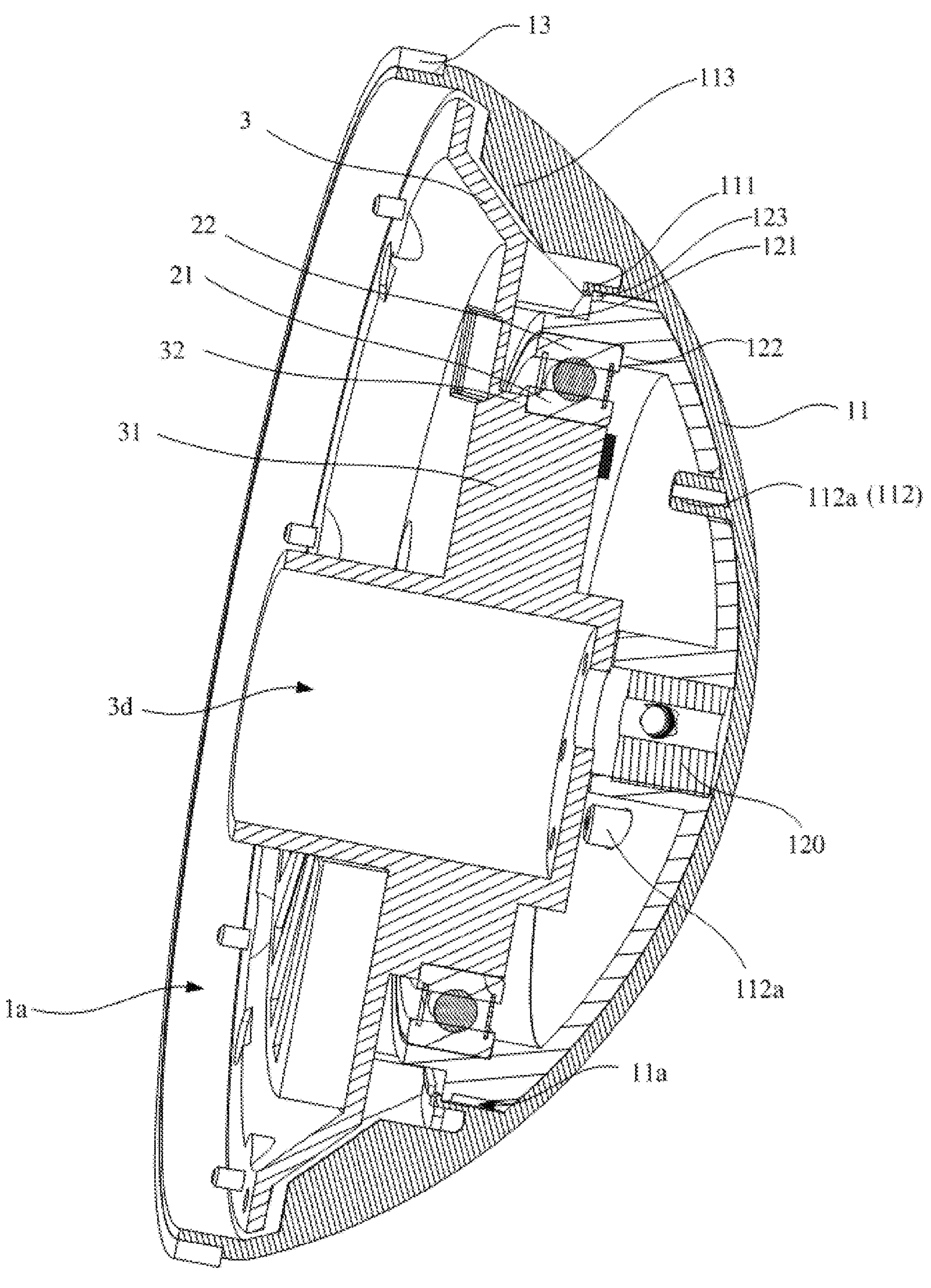
FIG. 2 is a schematic cross-sectional view in FIG. 1.
Figure 3:
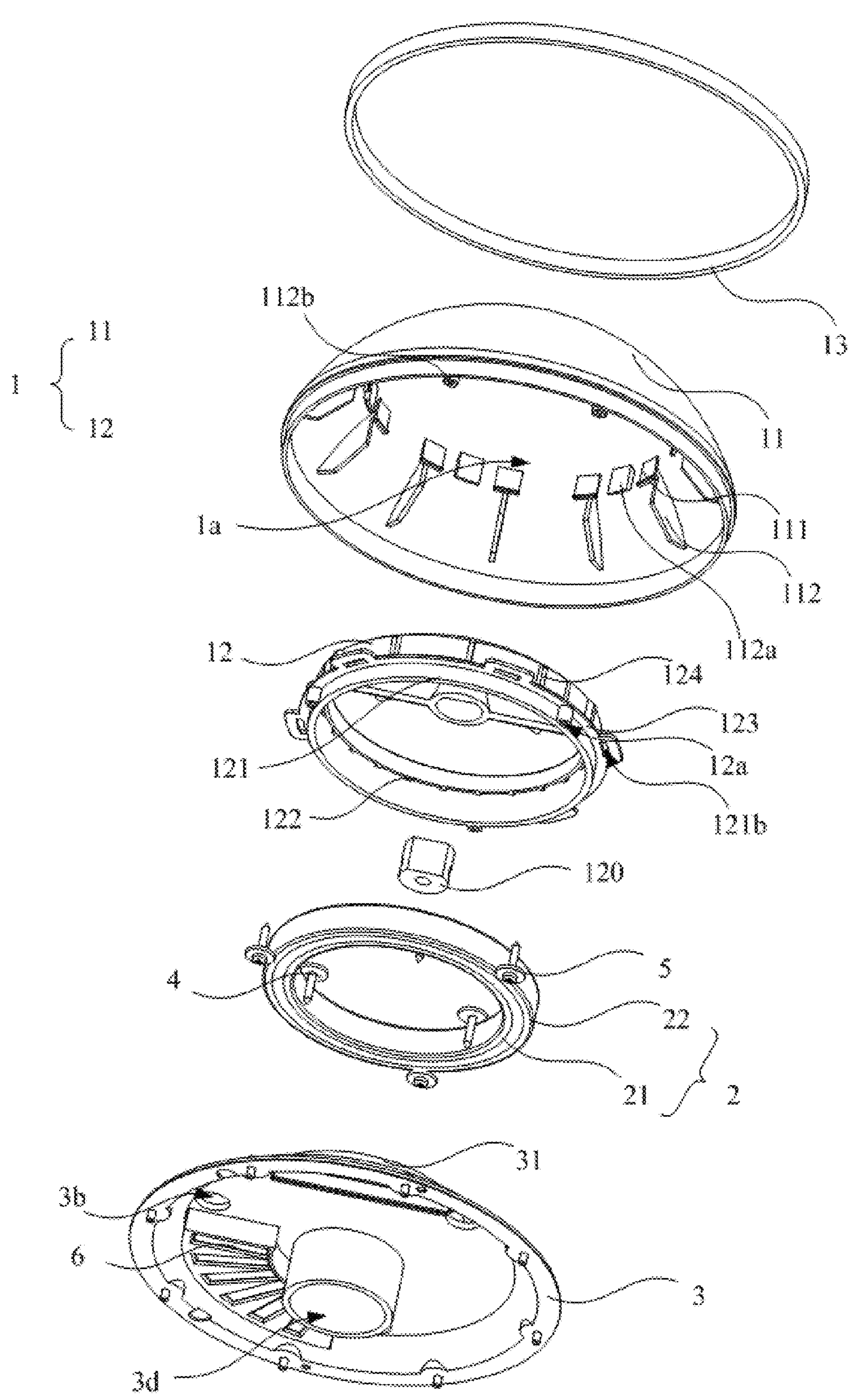
FIG. 3 is a schematic exploded structural view of FIG. 1.

In an embodiment, as shown in FIG. 1, FIG. 2 and FIG. 3, the rotating wheel apparatus 10 includes: a rotating assembly 1, a bearing 2 and a supporting base 3.

The rotating assembly 1 is provided with an accommodating groove 1*a*.

The bearing 2 is accommodated in the accommodating groove 1*a*, and the bearing 2 is connected to the rotating assembly 1.

The supporting base 3 is close to a notch of the accommodating groove 1*a*, and the supporting base 3 is connected to the bearing 2, so that the rotating assembly 1 is rotationally connected to the supporting base 3.

Figure 9:
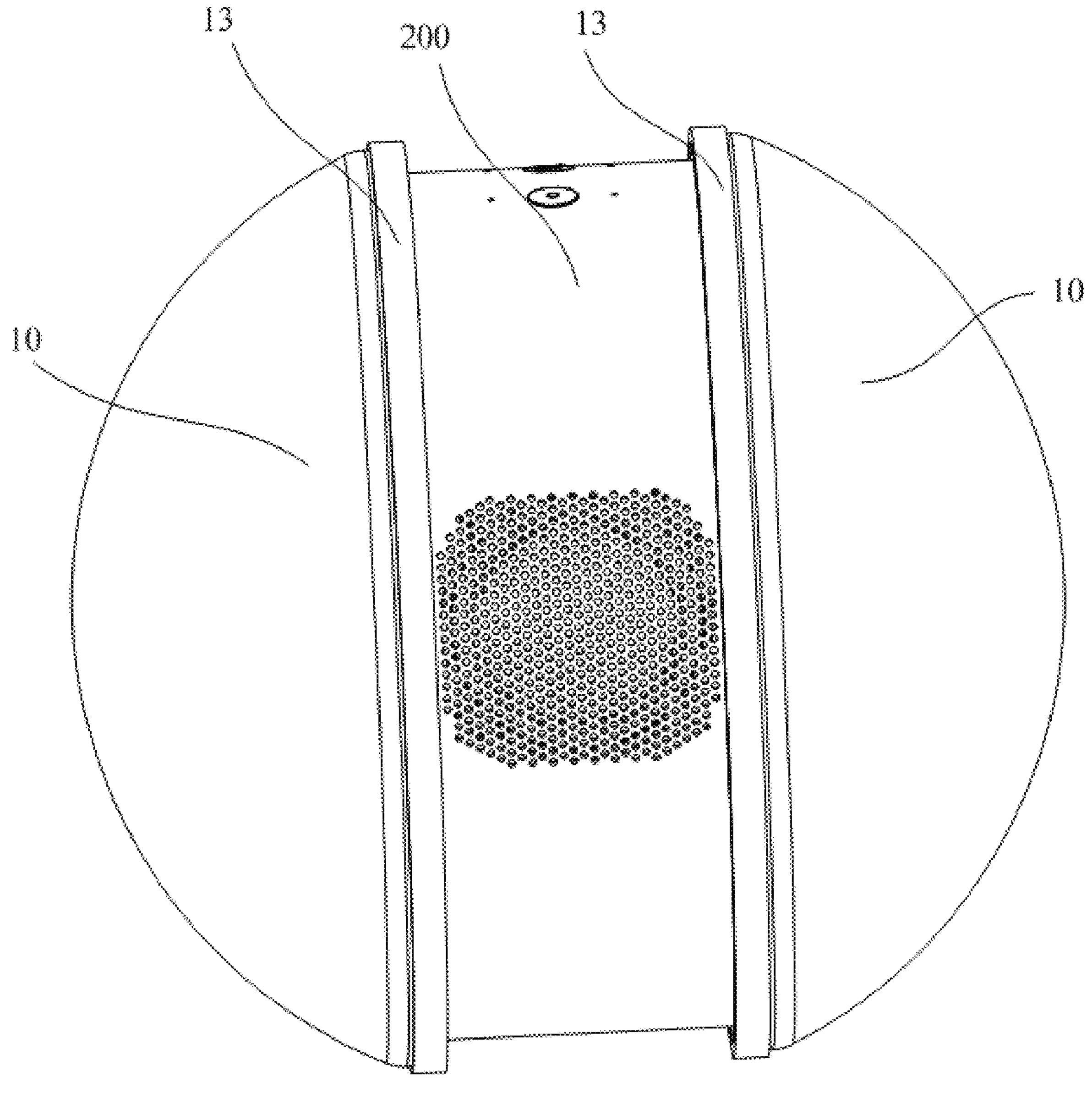
FIG. 9 is a schematic structural view of a robot according to an embodiment of the present application.
Figure 10:
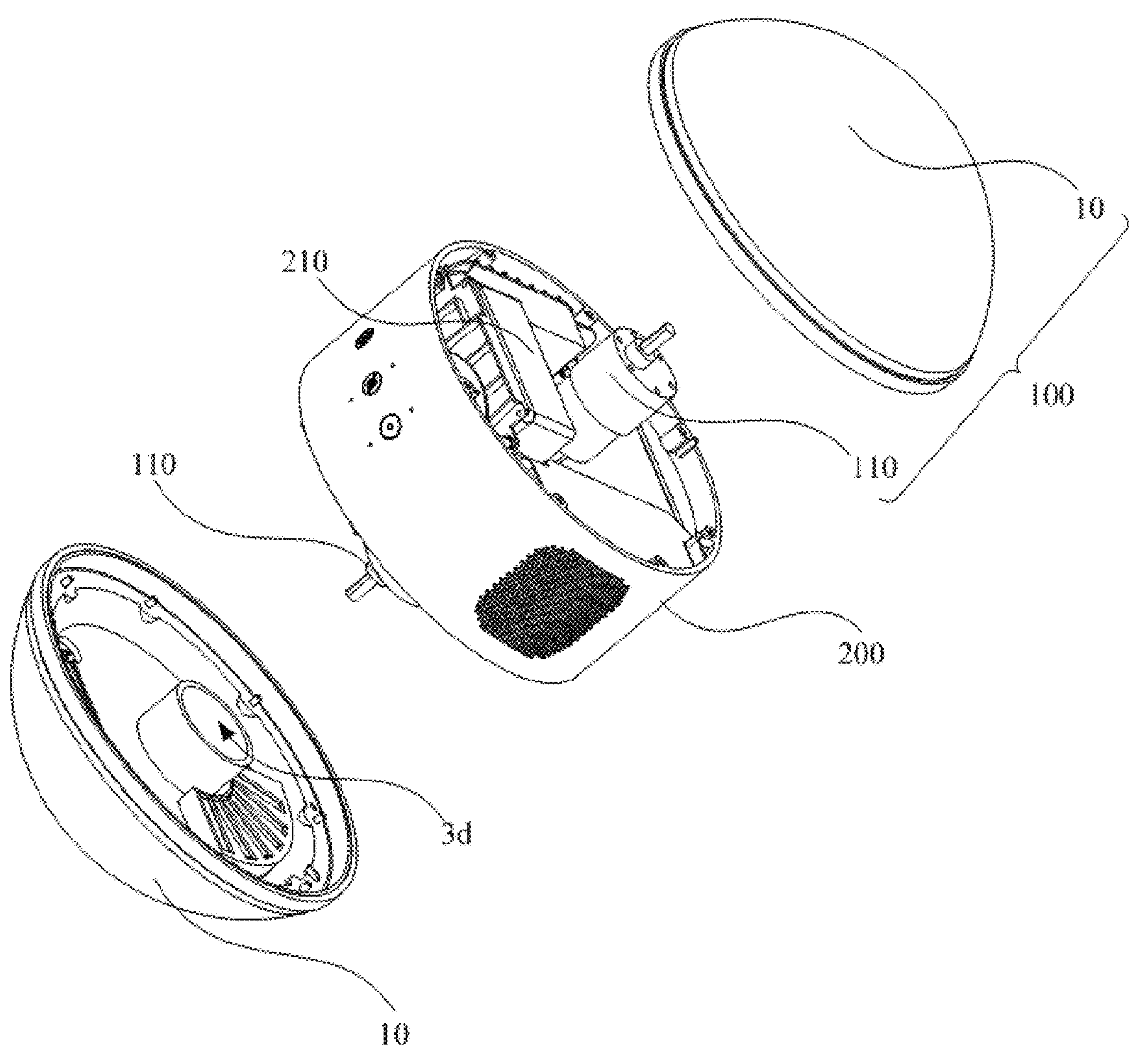
FIG. 10 is a schematic exploded structural view of FIG. 9.

In this embodiment, the supporting base 3 provides a stable support and can be used to connect to external structures. Referring to FIG. 9 and FIG. 10, when this embodiment is applied to a robot, the supporting base 3 can be connected to a main body 200 of the robot.

In this embodiment, the supporting base 3 is close to the notch position of the accommodating groove 1*a*, which can be conveniently connected to the external structure through the supporting base 3. The rotating assembly 1 is connected to the supporting base 3 through the bearing 2 to rotate. When rotating on the ground, the rotating assembly 1 can push the robot to move. The bearing 2 can improve a rotation stability of the rotating assembly 1, reduce a friction, and save the energy. The bearing 2 is located in the accommodating groove 1*a*, and the rotating assembly 1 can wrap and hide the bearing 2 to protect the bearing 2. When this embodiment is applied to a robot, it can be ensured that only the rotating assembly 1 is exposed and the other components are hidden, making the robot beautiful in appearance. At the same time, the rotating assembly 1 is connected to the supporting base 3 through the bearing 2, which is convenient to assembly, improve the installation efficiency, and reduces the difficulty of assembly.

The rotation of the rotating assembly 1 relative to the supporting base 3 can be realized manually or through a driving member 110, and the driving member 110 can be a motor. When the rotating wheel apparatus 10 is applied to the robot, the rotating assembly 1 can be driven to rotate by the driving member 110. The driving member 110 is installed on the supporting base 3, and the supporting base 3 provides a stable support for the driving member 110.

The robot can be a spherical robot, including a main body 200 and two rotating wheel apparatus 10. The supporting base 3 of the two rotating wheel apparatus 10 is connected to the main body 200, which is different from four wheels of a car. If the rotating assembly 1 is not connected to the supporting base 3 through the bearing 2, then the rotating assembly 1 only rotates around a motor shaft, that is, rotates at one point, which is unstable. After connected to the supporting base 3 through the bearing 2, the rotating assembly 1 can also rotate around bearing 2, that is, rotate around one surface, so that the rotation of the rotating assembly 1 is more stable, and a surface connection of bearing 2 has a stronger connection strength than the point connection of the motor shaft.

Meanwhile, when using the robot, it is necessary to ensure that the main body 200 of the robot remains as still as possible. It is different from a balancing car, which has someone standing in the middle. If the spherical robot directly drives the rotating assembly 1 to rotate through the motor, it will easily cause the main body 200 of the robot to become unstable. However, the bearing 2 reduces the relative motion between the main body 200 and the rotating assembly 1, which can ensure that the main body 200 is more stable.

In addition, in this embodiment, there is no need to install a reduction gear between the driving member 110 and the rotating assembly 1, which reduces the design difficulty.

Figure 8:
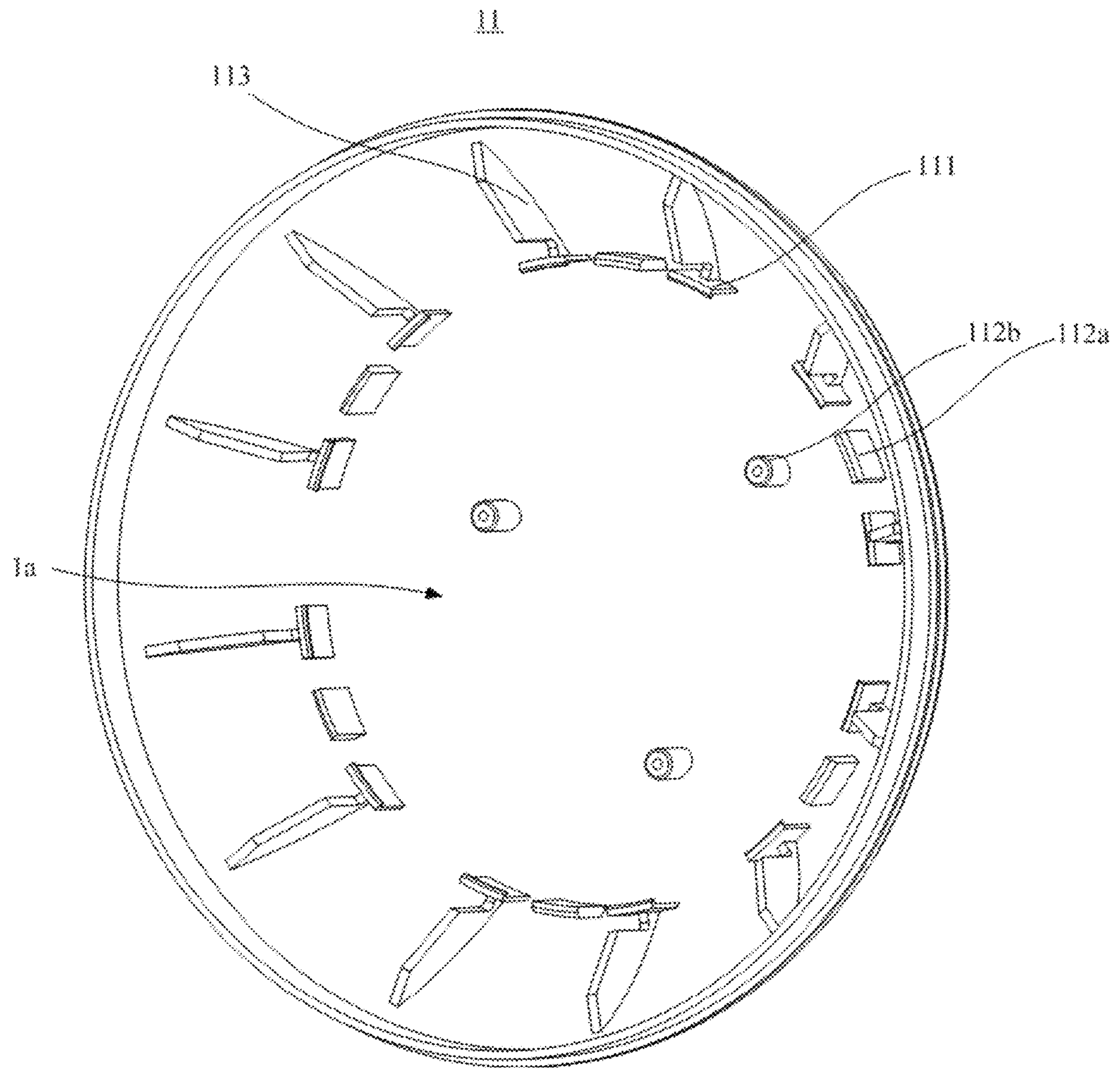
FIG. 8 is a schematic view of a housing in FIG. 3.

In an embodiment, as shown in FIG. 2, FIG. 3 and FIG. 8, the rotating assembly 1 includes: a housing 11 and a transmission member 12.

The housing 11 is provided with the accommodating groove 1*a*.

The transmission member 12 is located in the accommodating groove 1*a* and between the housing 11 and the supporting base 3; the transmission member 12 is connected to the bearing 2, and the transmission member 12 is detachably connected to the housing 11.

It can be understood that the transmission member 12 is connected to the bearing 2, so that the transmission member 12 can rotate relative to the supporting base 3, and the rotation of the transmission member 12 can drive the housing 11 to rotate. When the rotating wheel apparatus 10 is applied to a robot, the robot is placed on the ground or other application scenarios, the housing 11 is abutted against the ground, etc, and the rotation of the housing 11 can drive the robot to move. In this embodiment, the housing 11 is provided with the accommodating groove 1*a*, and the transmission member 12 is provided in the accommodating groove 1*a*, which can hide the transmission member 12, protect the transmission member 12 and the bearing 2, avoid an impact of external foreign matter on the transmission member 12 and the bearing 2, and at the same time make a beautiful appearance. The housing 11 is clamped with the transmission member 12, which can realize a convenient disassembly and installation of the housing 11 and the transmission member 12, improve the efficiency, reduce the difficulty, and avoid damaging the housing 11 or the transmission member 12 during the installation and disassembly process.

In other embodiments, the rotating assembly 1 is an integrally formed mechanism, that is, the housing 11 and the transmission member 12 are integrally formed and fixed and cannot be disassembled, that is, the transmission member 12 is not solely provided.

When applied to the robot, the detachable connection between the transmission member 12 and the housing 11 can make the robot more beautiful in appearance compared to the integrally formed fixed arrangement of the housing 11 and the transmission member 12.

Figure 11:
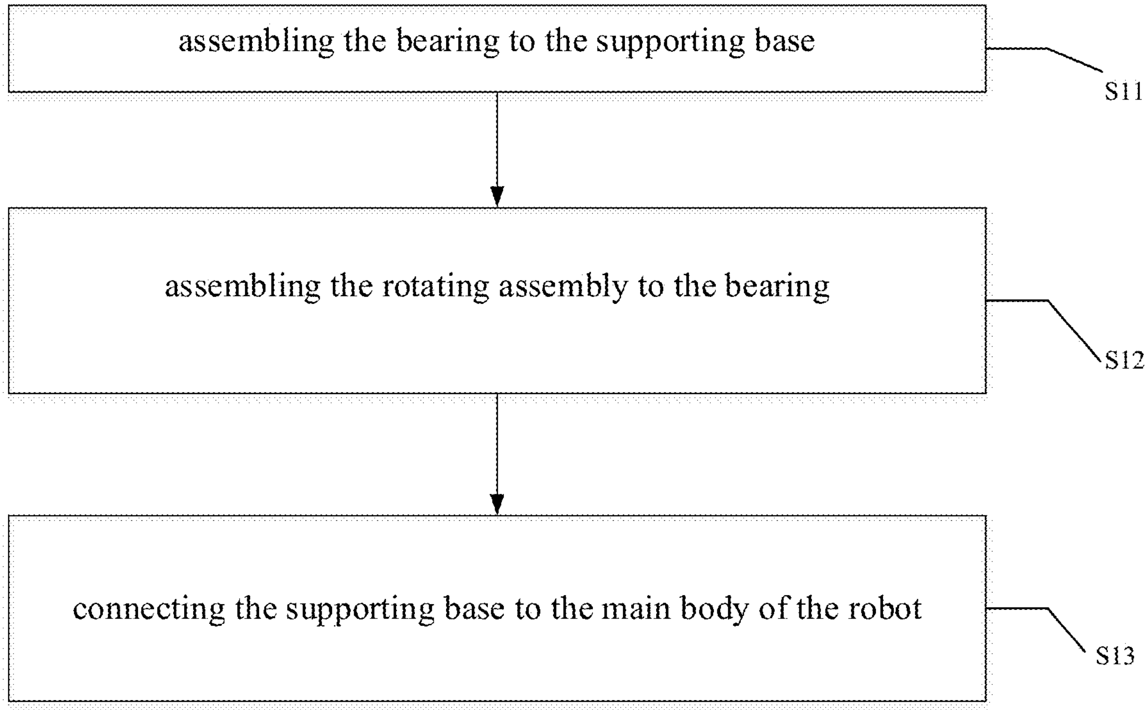
FIG. 11 is a schematic flowchart of an installation process of the rotating wheel apparatus according to an embodiment of the present application.

In an embodiment, if the housing 11 and the transmission member 12 are integrally formed and fixed structures, then as shown in FIG. 11, an installation process of the rotating wheel apparatus 10 is:

- S11: assembling the bearing 2 to the supporting base 3, where the bearing 2 can be fixedly connected to the supporting base 3 through a first locking member 4 in the following embodiment of the present application, and the bearing 2 can be interference fitted with the supporting base 3;
- S12: assembling the rotating assembly 1 to the bearing 2, where the rotating assembly 1 can be fixedly connected to the bearing 2 through a second locking member 5 in the following embodiment of the present application, and the bearing 2 can be interference fitted with the rotating assembly 1; at this time, the rotating wheel apparatus 10 is formed;
- S13: connecting the supporting base 3 to the main body of the robot to complete the assembly of the rotating wheel apparatus 10 and the main body 200.

If the gap between the supporting base 3 and the main body 200 needs to be hidden, the supporting base 3 can be located in the accommodating groove 1*a* of the rotating assembly 1. That is to say, the rotating assembly 1 can cover the gap between the supporting base 3 and the main body 200. However, this will make it inconvenient to use bolts to connect the supporting base 3 and the main body 200, and the supporting base 3 and main body 200 can only be connected by clamping, which will reduce the connection strength between the supporting base 3 and main body 200. If it needs to use bolts to connect the supporting base 3 and main body 200, the supporting base 3 can not be located in the accommodating groove 1*a* of the rotating assembly 1, that is, the rotating assembly 1 can not block the gap between the supporting base 3 and main body 200, so that the gap will be exposed, which reduces the overall aesthetics of the robot, and makes it easier for dust and other foreign matter to enter compared to the situation of using the rotating assembly 1 to cover the gap.

Figure 12:
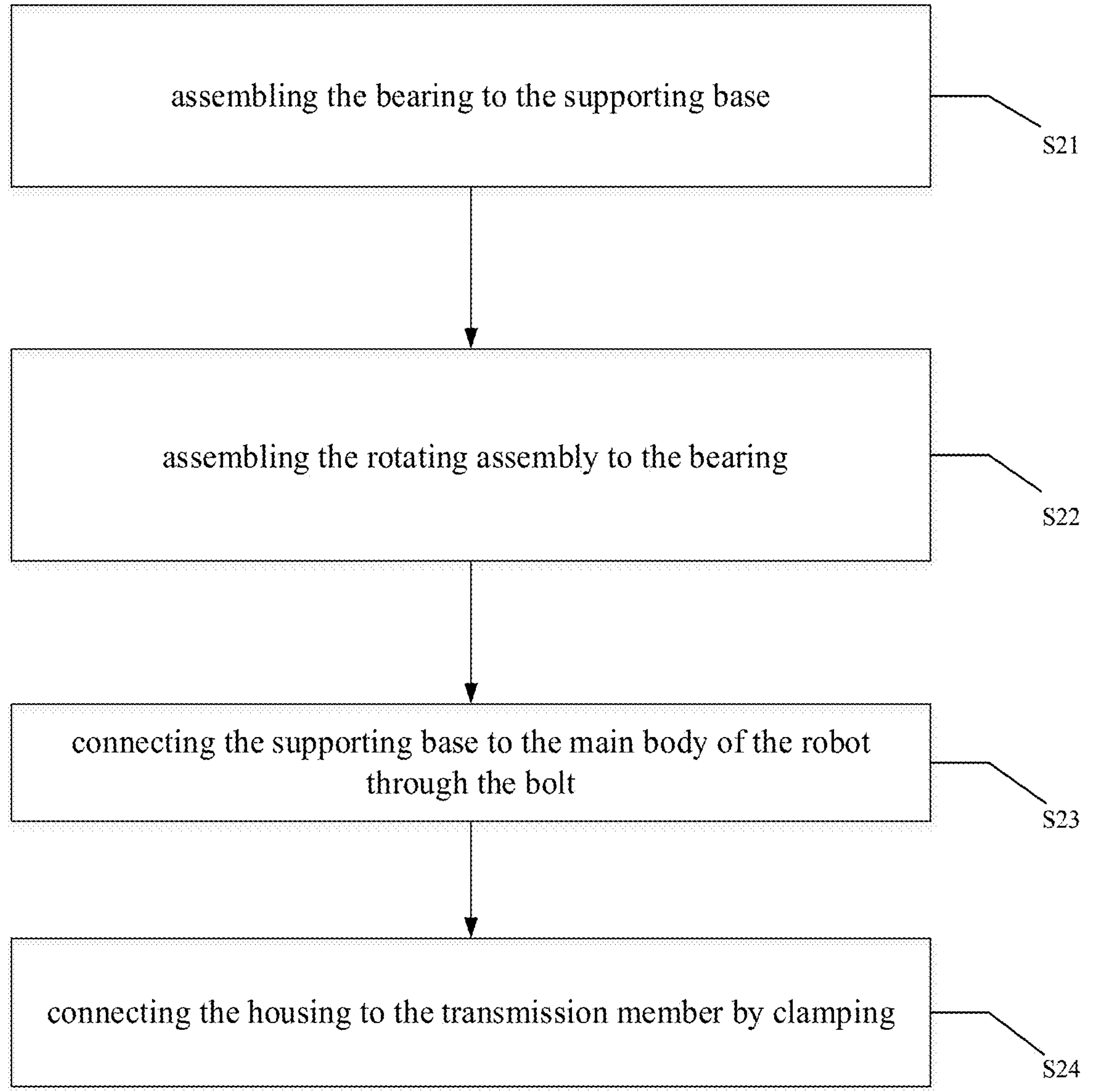
FIG. 12 is a schematic flowchart of an installation process of the rotating wheel apparatus according to an embodiment of the present application.

When the transmission member 12 is detachably connected to the housing, as shown in FIG. 12, the installation process of the rotating wheel apparatus 10 is:

- S21: assembling the bearing 2 to the supporting base 3, where the bearing 2 can be fixedly connected to the supporting base 3 through a first locking member 4 in the following embodiment of the present application, and the bearing 2 can be interference fitted with the supporting base 3;
- S22: assembling the rotating assembly 1 to the bearing 2, where the rotating assembly 1 can be fixedly connected to the bearing 2 through a second locking member 5 in the following embodiment of the present application, and the bearing 2 can be interference fitted with the rotating assembly 1;
- S23: connecting the supporting base 3 to the main body of the robot through the bolt;
- S24: connecting the housing 11 to the transmission member 12 by clamping, to realize the connection between the rotating wheel apparatus 10 and the main body 200.

As shown in FIG. 2, since the housing 11 is connected to the transmission member 12 after the supporting base 3 is connected to the main body 200, an edge of the housing 11 can extend to a side of the supporting base 3 away from the transmission member 12, which means that the housing 11 can be used to block the gap between the supporting base 3 and the main body. Therefore, compared with the embodiment in which the transmission member 12 is not provided solely, when the transmission member 12 is provided, the connection strength between the supporting base 3 and the main body 200 can be ensured (that is, the two can be connected by bolts), which can also ensure the appearance of the supporting base 3 and the main body 200 (that is, the gap between the two joints can be blocked).

Figure 4:
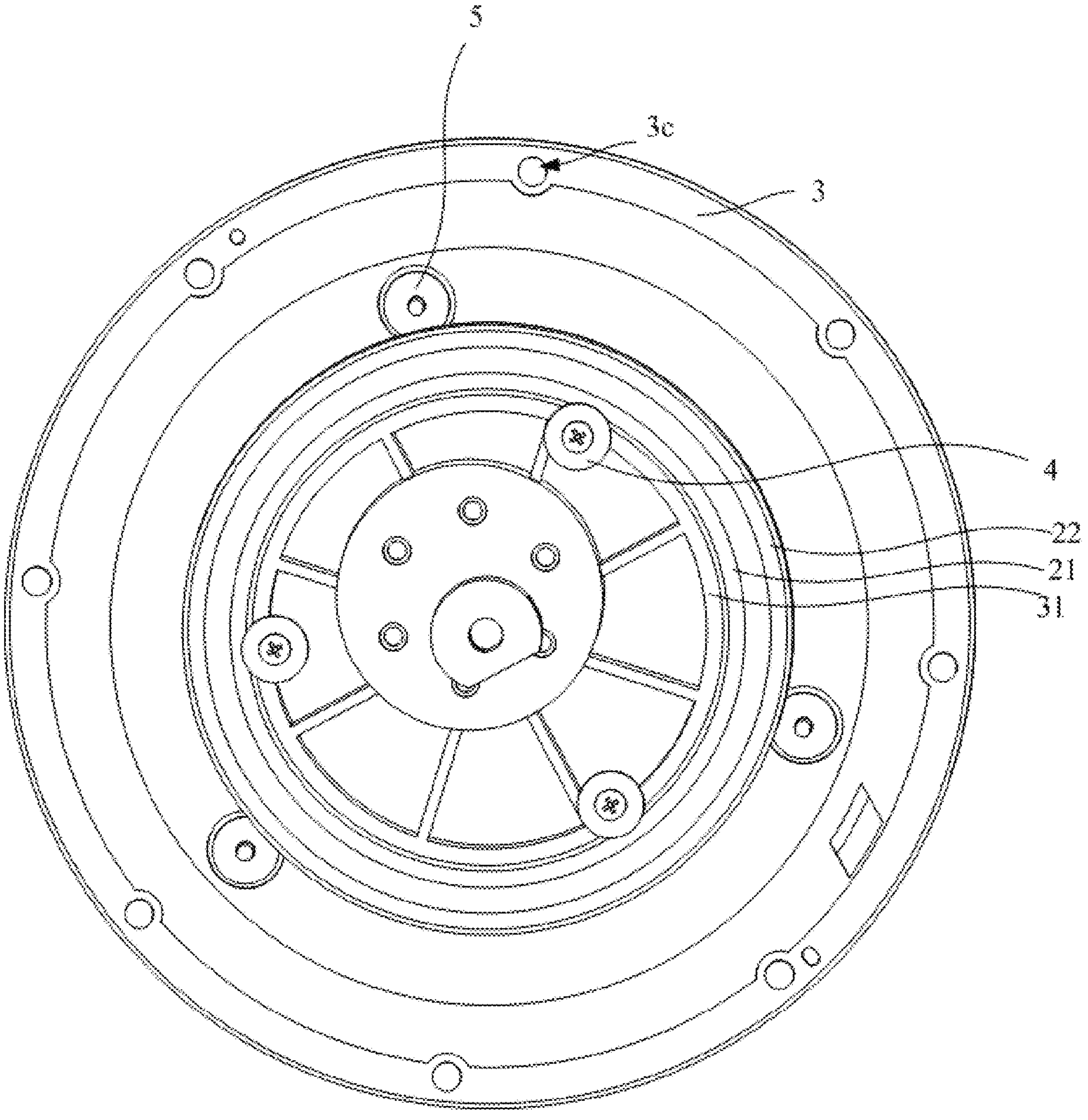
FIG. 4 is a schematic structural view of FIG. 1 after removing the rotating assembly.

In an embodiment, as shown in FIG. 2, FIG. 3 and FIG. 4, the supporting base 3 and the transmission member 12 are respectively connected to both sides of the bearing 2, and one side of the supporting base 3 facing the transmission member 12 is provided with a supporting portion 31, an inner ring 21 of the bearing 2 is sleeved on the supporting portion 31, and the inner ring 21 and the supporting portion 31 are locked through the first locking member 4.

A transmission portion 121 is provided on the side of the transmission member 12 facing the supporting base 3. The transmission portion 121 is sleeved on an outer ring 22 of the bearing 2, and the outer ring 22 and the transmission portion 121 are locked by a second locking member 5.

It can be understood that the structure can be made more compact through the above design. The design of the supporting portion 31 and the transmission portion 121, the bearing 2 is sleeved on the supporting portion 31, and the transmission portion 121 is sleeved on the bearing 2, so that the position of the bearing 2 can be limited. At the same time, the locking of the first locking member 4 and second locking member 5 can improve the position stability of bearing 2 and the connection stability of bearing 2 with the supporting base 3 and the transmission member 12, thereby improving the stability of the housing 11 and ensuring the stability of the rotating wheel apparatus 10 during operation. When the rotating wheel apparatus 10 moves past the steps, the locking of the first locking member 4 and the second locking member 5 can ensure that the bearing 2 will not shake or shift at this time, thereby ensuring that the rotating wheel apparatus 10 can pass the steps smoothly. At the same time, the supporting portion 31 can support the bearing 2 and provide positioning for the installation of the bearing 2, achieving a quick installation.

Figure 5:
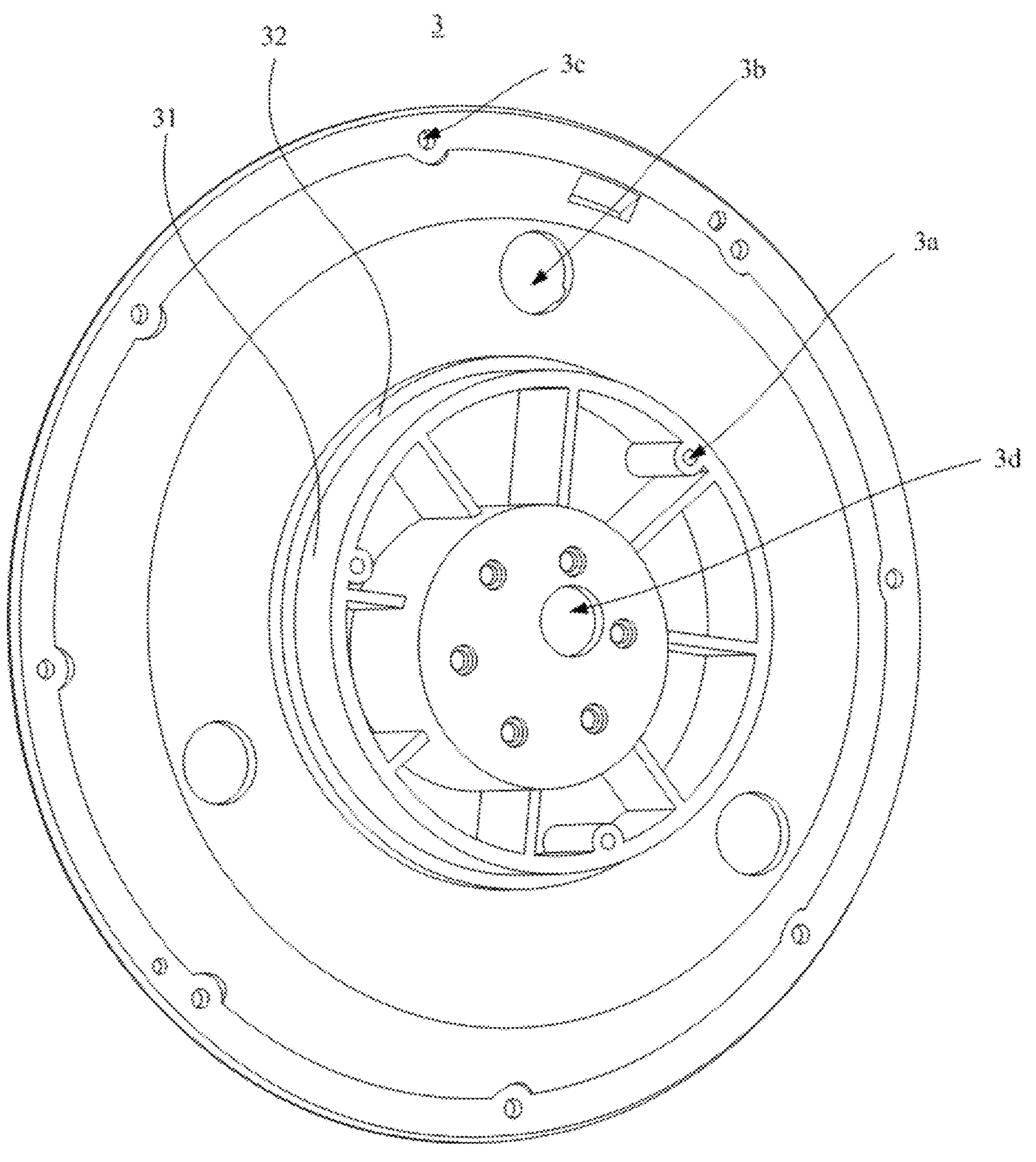
FIG. 5 is a schematic structural view of a supporting base in FIG. 3.

In an embodiment, as shown in FIG. 2, FIG. 4 and FIG. 5, an outer periphery of the supporting portion 31 is provided with a first limiting portion 32, and one side of the inner ring 21 facing the supporting base 3 is abutted against the first limiting portion 32.

The supporting portion 31 is provided with a first mounting hole 3*a*. One end of the first locking member 4 is abutted against one side of the inner ring 21 away from the first limiting portion 32 and the side of the supporting base 3 facing the transmission member 12, and the other end of the first locking member 4 is inserted into the first mounting hole 3*a*, so that the supporting portion 31 and the inner ring 21 are locked.

It can be understood that the other end of the first limiting portion 32 and the other end of the first locking member 4 are respectively abutted against the opposite sides of the inner ring 21 to limit the inner ring 21, which can prevent the inner ring 21 from shaking or shifting, and ensure the positional stability of the inner ring 21.

In this embodiment, the first locking member 4 includes a first connecting rod and a first clamping joint connected to the first connecting rod. An outer periphery of the first connecting rod is provided with an external thread, and a wall of the first mounting hole 3*a* is provided with an internal thread. The first connecting rod is threadedly connected to the wall of the first mounting hole 3*a*. The first connecting rod passes through the first clamping joint and penetrates into the first mounting hole 3*a*, and the first clamping joint is pressed against the side of the inner ring 21 away from the first limiting portion 32, that is, the side of the inner ring 21 facing the transmission member 12. A limiting space is formed between the first limiting portion 32 and the first clamping joint, and the inner ring 21 is limited in the limiting space to lock the inner ring 21 and the supporting base 3. During assembly, the first locking member 4 can be installed from the side where the transmission member 12 is located, which is easy to install.

In other embodiments, the inner ring 21 of the bearing 2 is provided with the first mounting hole 3*a*, and the bearing 2 and the supporting portion 31 are locked by inserting the first locking member 4 into the first mounting hole 3*a*. However, since the bearing 2 is a standard part and has a large hardness, it is inconvenient to dig a hole, so that to arrange the first mounting hole 3*a* in the supporting portion 31 is better than to arrange the first mounting hole 3*a* in the inner ring 21 of the bearing 2.

Figure 6:
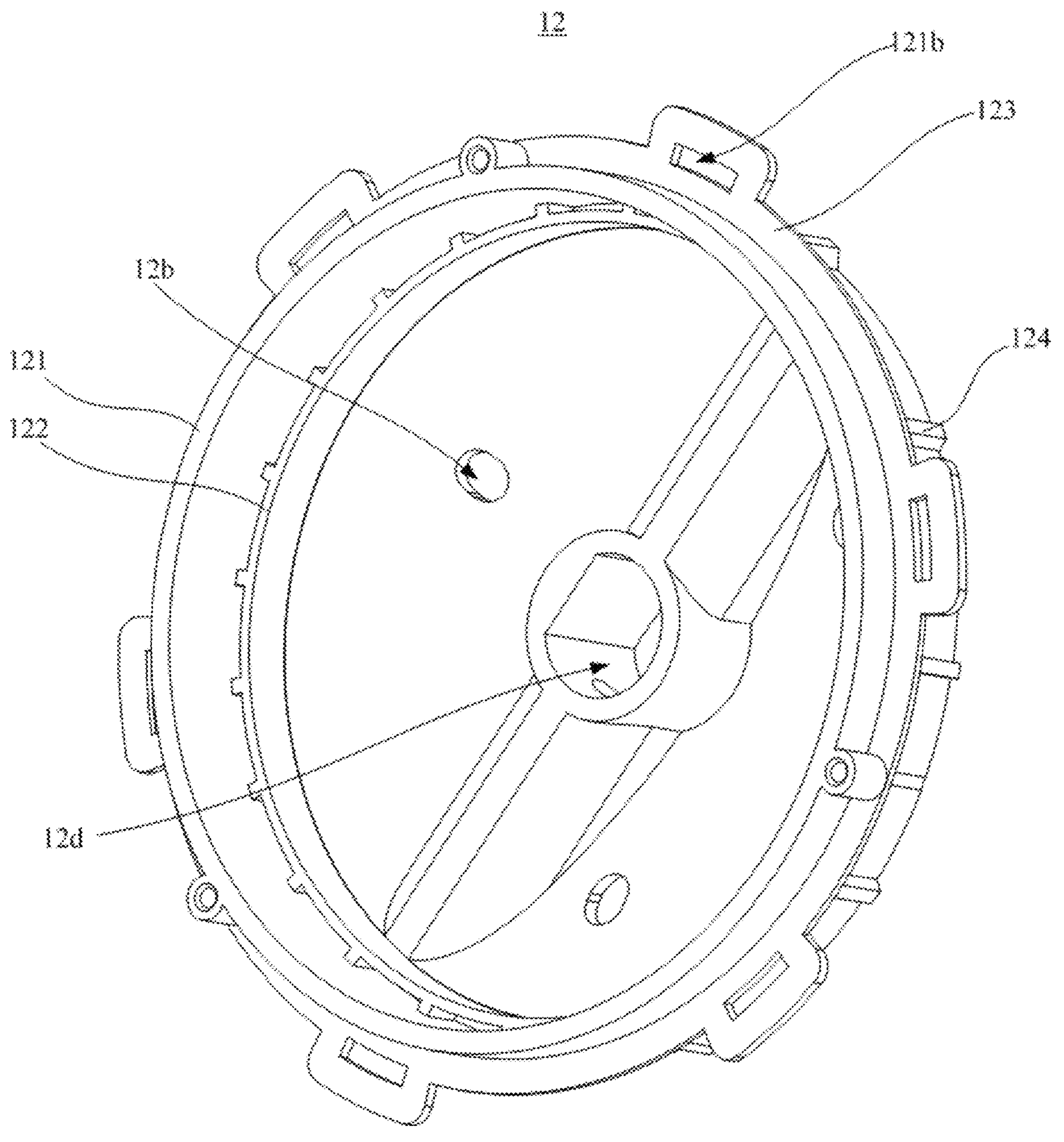
FIG. 6 is a schematic structural view of a transmission member in FIG. 3.

In an embodiment, as shown in FIG. 2, FIG. 4 and FIG. 6, one side of the transmission portion 121 facing the bearing 2 is provided with a second limiting portion 122, and one side of the outer ring 22 facing the transmission member 12 is abutted against the second limiting portion 122.

The transmission portion 121 is provided with the second mounting hole 12*a*. One end of the second locking member 5 is abutted against the side of the outer ring 22 away from the second limiting portion 122 and the side of the transmission portion 121 facing the supporting base 3, and the other end of the second locking member 5 is inserted into the second mounting hole 12*a* to lock the transmission portion 121 and the outer ring 22.

It can be understood that the other end of the second limiting portion 122 and the other end of the second locking member 5 are respectively abutted against the opposite sides of the outer ring 22 to limit the outer ring 22, which can prevent the outer ring 22 from shaking or shifting, and ensure the positional stability of the outer ring 22.

In this embodiment, the second locking member 5 includes a second connecting rod and a second clamping joint connected to the second connecting rod. An outer periphery of the second connecting rod is provided with an external thread, and a wall of the second mounting hole 12*a* is provided with an internal thread. The second connecting rod is threadedly connected to the wall of the second mounting hole 12*a*. The second connecting rod passes through the second clamping joint and penetrates into the second mounting hole 12*a*, and the second clamping joint is pressed against the side of the inner ring 21 away from the second limiting portion 122, that is, the side of the outer ring 22 facing the supporting base 3. A limiting space is formed between the second limiting portion 122 and the second clamping joint, and the outer ring 22 is limited in the limiting space to lock the outer ring 22 and the transmission member 12. During assembly, the second locking member 5 can be installed from the side where the supporting base 3 is located, which is easy to install.

In other embodiments, the outer ring 22 of the bearing is provided with the second mounting hole 12*a*, and the second locking member 5 is inserted into the second mounting hole 12*a* to lock the bearing 2 and the transmission portion 121. However, since the bearing 2 is a standard part and has greater hardness, it is inconvenient to dig a hole. Therefore, to arrange the second mounting hole 12*a* in the transmission portion 121 is better than to arrange the second mounting hole 12*a* on the outer ring 22 of the bearing 2.

In an embodiment, the supporting base 3 and the transmission member 12 are respectively located on both sides of the bearing 2. A supporting portion 31 is provided on one side of the supporting base 3 facing the transmission member 12. The supporting portion 31 is sleeved on the outer ring 22 of the bearing 2, and the outer ring 22 and the supporting portion 31 are locked through the first locking member 4.

A transmission portion 121 is provided on one side of the transmission member 12 facing the supporting base 3. The inner ring 21 of the bearing 2 is sleeved on the transmission portion 121, and the inner ring 21 and the transmission portion 121 are locked by the second locking member 5.

The side of the supporting portion 31 facing the bearing 2 is provided with a first limiting portion 32, and the side of the outer ring 22 facing the supporting base 3 is abutted against the first limiting portion 32.

The supporting portion 31 is provided with the first mounting hole 3*a*. One end of the first locking member 4 is abutted against the side of the outer ring 22 away from the first limiting portion 32 and the side of the supporting portion 31 facing the transmission member 12, and the other end of the first locking member 4 is inserted into the first mounting hole 3*a*, so that the supporting portion 31 and the inner ring 21 are locked. It can be understood that the other end of the first limiting portion 32 and the other end of the first locking member 4 are respectively abutted against the opposite sides of the outer ring 22 to limit the outer ring 22, which can prevent the outer ring 22 from shaking or shifting, and ensure the positional stability of the outer ring 22.

The first locking member 4 includes the first connecting rod and the first clamping joint connected to the first connecting rod. The outer periphery of the first connecting rod is provided with the external thread, and the wall of the first mounting hole 3*a* is provided with the internal thread. The first connecting rod is threadedly connected to the wall of the first mounting hole 3*a*. The first connecting rod penetrates into the first mounting hole 3*a*, and part of the first clamping joint is abutted against the side of the outer ring 22 away from the first limiting portion 32, that is, the side of the outer ring 21 facing the transmission member 12. The limiting space is formed between the first limiting portion 32 and the first clamping joint, and the outer ring 21 is limited in the limiting space to lock the outer ring 22 and the supporting base 3. During assembly, the first locking member 4 can be installed from the side where the transmission member 12 is located, which is easy to install.

The second limiting portion 122 is provided on the outer periphery of the transmission portion 121, and the side of the inner ring 21 facing the transmission member 12 is abutted against the second limiting portion 122.

The transmission portion 121 is provided with the second mounting hole 12*a*. The end of the second locking member 5 is abutted against the side of the inner ring 21 away from the second limiting portion 122 and the side of the transmission portion 121 facing the supporting base 3. The other end of the second locking member 5 is inserted into the second mounting hole 12*a* to lock the transmission portion 121 and the outer ring 22. It can be understood that the other end of the second limiting portion 122 and the other end of the second locking member 5 are respectively abutted against the opposite sides of the inner ring 21 to limit the inner ring 21, which can prevent the inner ring 21 from shaking or shifting, and ensure the positional stability of the inner ring 21.

The second locking member 5 includes the second connecting rod and the second clamping joint connected to the second connecting rod. The outer periphery of the second connecting rod is provided with the external thread, and the wall of the second mounting hole 12*a* is provided with the internal thread. The second connecting rod is threadedly connected to the wall of the second mounting hole 12*a*. The second connecting rod penetrates into the second mounting hole 12*a*, and the second clamping joint is pressed against the side of the inner ring 21 away from the second limiting portion 122, that is, the side of the outer ring 22 facing the supporting base 3. The limiting space is formed between the second limiting portion 122 and the second clamping joint, and the outer ring 22 is limited in the limiting space to lock the outer ring 22 and the transmission member 12. During assembly, the second locking member 5 can be installed from the side where the supporting base 3 is located, which is easy to install.

In an embodiment, as shown in FIG. 1, FIG. 3 and FIG. 5, the supporting base 3 is provided with a first avoiding hole 3*b* corresponding to the second mounting hole 12*a*.

It can be understood that the first avoiding hole 3*b* in the supporting base 3 provides a position avoiding for the installation of the second locking member 5 and facilitates the installation of the second locking member 5.

In an embodiment, the transmission member 12 is provided with a second avoiding hole corresponding to the first mounting hole 3*a*.

It can be understood that the second avoiding hole in the transmission member 12 provides a position avoiding for the installation of the first locking member 4 and facilitate the installation of the first locking member 4.

In an embodiment, the supporting base 3 is provided with the first avoiding hole 3*b*, and the transmission member 12 is provided with the second avoiding hole.

In this embodiment, only the supporting base 3 is provided with the first avoiding hole 3*b*, and the transmission member 12 is not provided with the second avoiding hole. During assembly, the first locking member 4 can be installed first to install the bearing 2 on the supporting base 3, then the transmission member 12 is sleeved on the bearing 2, and the second locking member 5 is installed by through the first avoiding hole 3*b*.

In this embodiment, a plurality of the first mounting holes 3*a* are provided, and the plurality of first mounting holes 3*a* are in a circular array. Each of the first mounting holes 3*a* is provided with the first locking member 4. Through the arrangement of the plurality of the first mounting holes 3*a*, the locking stability of the inner ring 21 and the supporting portion 31 can be improved. A plurality of the second mounting holes 12*a* are also provided, and the plurality of second mounting holes 12*a* are in a circular array. Each of the second mounting holes 12*a* is provided with the second locking member 5. Through the arrangement of the plurality of the second mounting holes 12*a*, the locking stability of the outer ring 22 and the transmission portion 121 can be improved.

In an embodiment, as shown in FIG. 2 and FIG. 8, the wall of the accommodating groove 1*a* is provided with a hook 111. The hook 111 and the wall of the accommodating groove 1*a* are enclosed to form a limiting groove 11*a*, and part of the transmission member 12 is limited in the limiting groove 11*a*.

In an embodiment, the housing 11 can be connected to the transmission member 12 through various connection methods, such as the screw connection or the snap fit. In this embodiment, the housing 11 is snap-fitted to the transmission member 12, which can realize the convenient disassembly and installation of the housing 11 and the transmission member 12, improve the efficiency, reduce the difficulty, avoid damaging the housing 11 or the transmission member 12 during the installation and disassembly process, and also make the appearance more beautiful. At the same time, the transmission member 12 is snap-fitted with the housing 11, which can avoid opening screw holes on the housing 11 and ensure the beautiful appearance. By setting the hook 111, the detachable connection between the transmission member 12 and the housing 11 is realized, and the structure is compact, the connection is stable, and the opening of the housing 11 is avoided to ensure the beautiful appearance.

Figure 7:
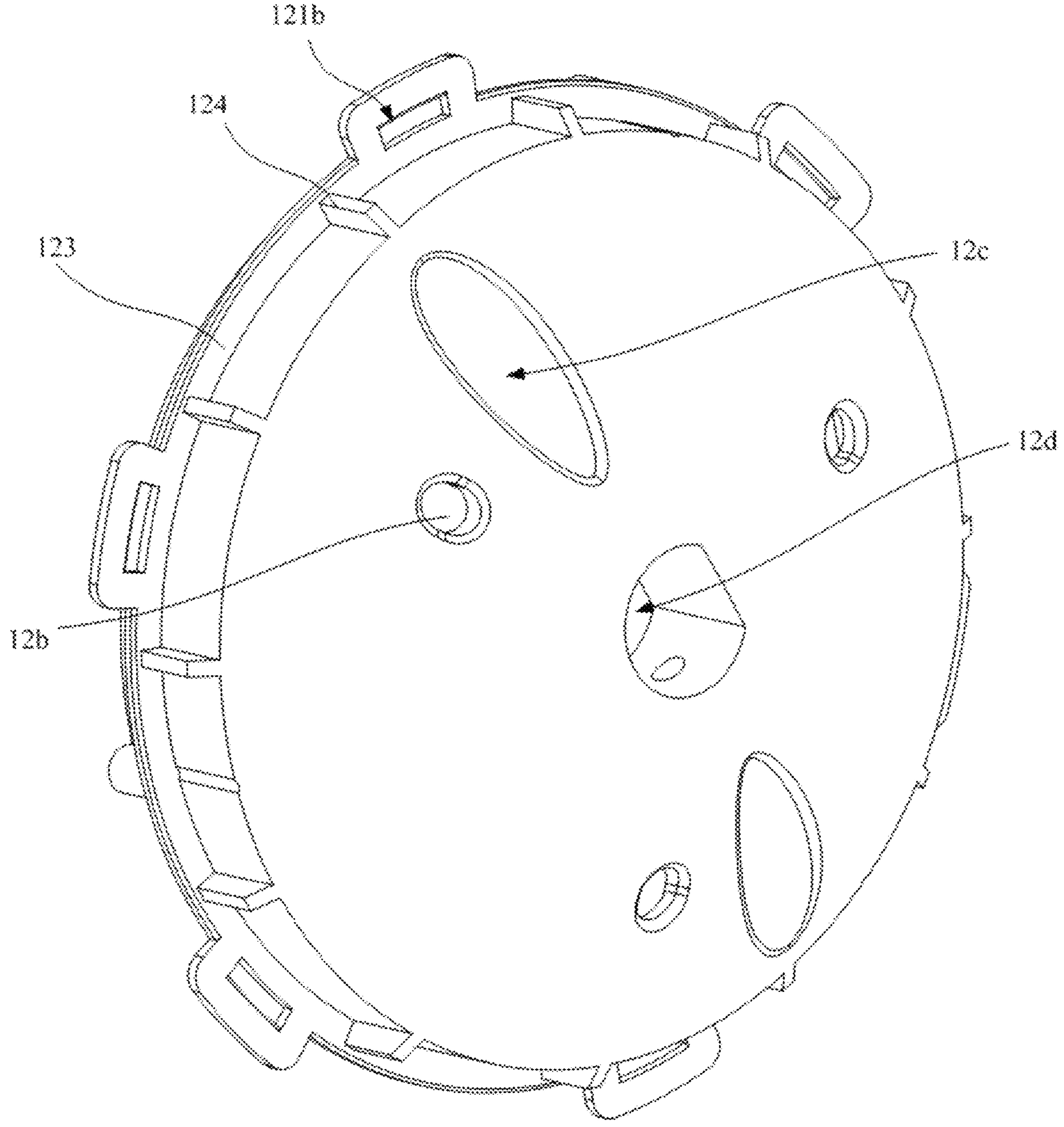
FIG. 7 is a schematic view of FIG. 6 from another perspective.

In an embodiment, as shown in FIG. 2, FIG. 6 and FIG. 7, the outer periphery of the transmission member 12 is provided with the clamping portion 123, and the clamping portion 123 is located in the limiting groove 11*a*. One side of the clamping portion 123 facing the housing 11 is provided with an inclined surface, the side of the clamping portion 123 away from the housing 11 is abutted against the hook 111, and the side of the transmission member 12 away from the supporting base 3 is abutted against and fitted with the wall of the accommodating groove 1*a*.

It can be understood that the side of the clamping portion 123 away from the housing 11 is abutted against the hook 111, and the side of the transmission member 12 away from the supporting base 3 is abutted against the wall of the accommodating groove 1*a* to limit part of the transmission member 12 in the limiting groove 11*a*. At the same time, the transmission member 12 is abutted against and fitted with the wall of the accommodating groove 1*a*, so that the transmission member 12 can support the housing 11. When an area corresponding to the transmission member 12 on the housing 11, that is, a middle part of the housing 11, collides, the housing 11 can be prevented from a dent.

One side of the clamping portion 123 facing the housing 11 is provided with an inclined surface, and the hook 111 is also provided with an inclined surface to facilitate the assembly of the housing 11 to the transmission member 12.

In this embodiment, as shown in FIG. 6 and FIG. 7, the side of the clamping portion 123 facing the housing 11 is provided with a first reinforcing rib 124, which can improve a strength of the clamping portion 123.

In an embodiment, as shown in FIG. 2, FIG. 3 and FIG. 8, the side of hook 111 away from the limiting groove 11*a* is provided with a second reinforcing rib 113, which can improve a strength of hook 111.

The second reinforcing rib 113 extends toward the supporting base 3, and is spaced apart from the supporting base 3. The shape of the side of the second reinforcing rib 113 close to the supporting base 3 is adapted to the shape of the supporting base 3. When the area of the housing 11 corresponding to the second reinforcing rib 113, that is, the area near the edge of the housing 11 collides, a large deformation of the housing 11 can be avoided. When the housing 11 dents inward, the second reinforcing rib 113 will be abutted against the supporting base 3, and the second supporting base 3 can support the housing 11. At the same time, the second reinforcing rib 113 is spaced apart from the supporting base 3, so that the housing 11 can be deformed slightly to buffer.

In an embodiment, as shown in FIG. 2, FIG. 3, FIG. 6, FIG. 7 and FIG. 8, the transmission member 12 is provided with a plurality of positioning holes, and the wall of the accommodating groove 1*a* is provided with a plurality of positioning columns 112, each of the positioning columns 112 is inserted into each of the positioning holes.

It can be understood that the cooperation between the positioning hole and the positioning column 112 can realize the rapid positioning and installation of the housing 11 and the transmission member 12, and at the same time, ensure the synchronous rotation of the transmission member 12 and the housing 11.

In this embodiment, the positioning hole includes a first positioning hole 121*b* and a second positioning hole 12*b*, and the positioning column 112 includes a first positioning column 112 and a second positioning column 112.

The clamping portion 123 is provided on the side of the transmission member 12 away from the bearing 2. A plurality of positioning bosses are provided at the peripheral edge of the clamping portion 123. The plurality of positioning bosses are arranged at intervals, and each of the positioning bosses is provided with the first positioning hole 121*b*. The housing 11 is provided with a plurality of first positioning columns 112, and each of the first positioning columns 112 is matched with the first positioning hole 121*b*.

The central area of the transmission member 12 is provided with a plurality of second positioning holes 12*b*, and the plurality of second positioning holes 12*b* are arranged at intervals. The housing 11 is provided with a plurality of second positioning columns 112, and each of the second positioning columns 112 is matched with the second positioning hole 12*b*.

The positioning holes are provided on the periphery and the middle area of the transmission member 12, and the positioning columns 112 are correspondingly provided on the housing 11, which can ensure a uniform force when transmitting power between the transmission member 12 and the housing 11.

In an embodiment, as shown in FIG. 5, a third mounting hole 3*c* is provided on the edge of the supporting base 3, and a projection of the transmission member 12 on the supporting base 3 is located on the side of the third mounting hole 3*c* close to a center line of the supporting base 3.

It can be understood that the projection of the transmission member 12 on the supporting base 3 is located on the side of the third mounting hole 3*c* close to the center line of the supporting base 3, that is, the peripheral size of the transmission member 12 is smaller than the peripheral size of the supporting base 3, and the third mounting hole 3*c* can be exposed. When the supporting base 3 is connected to the outside through bolts inserted into the third mounting hole 3*c*, the operation can be facilitated, and the transmission member 12 will not affect the operation process.

In this embodiment, a plurality of third mounting holes 3*c* are provided in a circular array.

In an embodiment, as shown in FIG. 1, FIG. 2, FIG. 3 and FIG. 9, the rotating assembly 1 also includes a friction belt 13, the outer periphery of the housing 11 is provided with a mounting groove, and the friction belt 13 is provided in the mounting groove and partially extends out of the mounting groove.

It can be understood that when the rotating wheel apparatus 10 is running on the ground, the friction belt 13 can be arranged to increase the friction between the friction belt 13 and the ground, ensuring that the rotating wheel apparatus 10 moves smoothly on the ground and reducing the slippage.

In an embodiment, as shown in FIG. 1 and FIG. 3, the rotating wheel apparatus 10 further includes a counterweight 6, and the counterweight 6 is provided at the supporting base 3.

In this embodiment, the counterweight 6 is arranged eccentrically with respect to the center line of the supporting base 3. By arranging the counterweight 6, the center of gravity can be lowered and the stability of the operation of the rotating wheel apparatus 10 can be improved.

In an embodiment, as shown in FIG. 2, the supporting base 3 is located in the accommodating groove 1*a*, and the notch of the accommodating groove 1*a* extends to the side of the supporting base 3 away from the transmission member 12.

It can be understood that when the rotating wheel apparatus 10 is installed on the main body 200 of the robot, after the supporting base 3 is connected to the main body 200, since the notch of the accommodating groove 1*a* extends to the side of the supporting base 3 away from the transmission member 12, the notch of the accommodating groove 1*a* will be sleeved on the outer wall of the main body 200, which can eliminate the possibility of the main body 200 and the rotating assembly 1 forming a gap in a direction parallel to the horizontal plane, thereby beautifying the appearance. It can also ensure that when the robot is placed on the running surface, the rotating assembly 1 contacts with the running surface, and there is a certain gap between the main body 200 and the running surface, which can ensure that the main body 200 will not rub against the running surface. The running surface can be the ground, etc.

The present application also provides a driving wheel 100, as shown in FIG. 10, the driving wheel 100 includes the rotating wheel apparatus 10, and a driving member 110.

The supporting base 3 of the rotating wheel apparatus 10 is provided with a first assembly hole 3*d*.

The driving member 110 is provided in the first assembly hole 3*d*, and an output end of the driving member 110 is connected to the rotating assembly 1.

The specific structure of the rotating wheel apparatus 10 refers to the above-mentioned embodiments. Since the driving wheel 100 adopts all the technical solutions of all the above-mentioned embodiments, it has at least all the beneficial effects brought by the technical solutions of the above-mentioned embodiments, which will not be repeated here.

In an embodiment, as shown in FIG. 3, the rotating assembly 1 further includes a connecting member 120, the transmission member 12 is provided with a second assembly hole 12*d*, the connecting member 120 is accommodated in the second assembly hole 12*d*, the connecting member 120 is sleeved on the output end of the driving member 110, and the connecting member 120 and the rotating assembly 1 are locked through a third locking member. The cross section of the connecting member 120 is D-shaped, that is, the connecting member 120 is provided with an arc surface and a flat surface connected end to end in the circumferential direction. Correspondingly, the second assembly hole 12*d* is D-shaped. The second assembly hole 12*d* is cooperated with the connecting member 120, so that the rotating assembly 1 will not rotate relative to the output end of the driving member 110, which ensures that the output end of driving member 110 drives the rotating assembly 1 to rotate synchronously.

In an embodiment, the transmission member 12 is provided with a fourth mounting hole 12*c* corresponding to the third locking member. The third locking member passes through the fourth mounting hole 12*c* to lock and connect the output end of the transmission member 12, the connecting member 120 and the driving member 110. The mounting hole 12*c* provides an avoiding position for the installation of the third locking member, making it easy to install. Obviously, since the transmission member 12 is detachably connected to the housing 11, the fourth mounting hole 12*c* can be provided in the transmission member 12 to ensure that the third locking member can be installed smoothly. At the same time, since the D-shaped hole is limited and cooperated with the connecting member 120, the torque exerted on the third locking member during rotation can be reduced, thereby improving the stability and service life of the third locking member.

In an embodiment, the connecting member 120 and the output end of the driving member 110 are locked through an interference fit.

In this embodiment, as shown in FIG. 7, since the bearing 2 is the main connecting component, priority is given to the interference fit between the bearing 2 and the rotating assembly 1 or the supporting base 3. At the same time, the first locking member 4 and the second locking member 5 further play a stabilizing role, while the output end of member 110 does not interfere with the second assembly hole 12*d*. If all three places interfere, that is, all three places are closely matched, which is technically difficult to achieve. Since the second assembly hole 12*d* is not oversized, it is easy to cause the rotating assembly 2 to shake. In order to improve the stability, it is necessary to set the fourth mounting hole 12*c* to install the third locking member. At the same time, if the transmission member 12 and the housing 11 are not detachable structures, the fourth mounting hole 12*c* needs to be opened on the outer surface of the rotating assembly 1, which is not beautiful. If the fourth mounting hole 12*c* is not provided for the sake of aesthetics, the stability will be reduced. Therefore, it is further explained that the detachable connection between the transmission member 12 and the housing 11 is better than the integrated structure between the transmission member 12 and the housing 11.

In addition, the above content is only used to express the further beneficial effects brought by the arrangement of the transmission member 12, such as blocking gaps, stability, and aesthetics, etc, but cannot explain that the transmission member 12 is a necessary technical feature.

In the same way, the interference fit of the outer ring in the bearing is also a further beneficial effect, or an effect that can be achieved on the basis of the transmission member 12, but is not a necessary technical feature.

In this embodiment, the third locking member is a bolt.

In this embodiment, the output end of the driving member 110 is provided with a threaded hole, and the third locking member is threadedly connected to the output end of the driving member 110. In other embodiments, the third locking member is abutted against the outer peripheral wall of the output end of the driving member 110. It can be understood that the threaded connection between the third locking member and the output end of the driving member can improve the connection strength and connection stability of the transmission member 12, the connecting member 120, and the output end of the driving member 110, ensuring the stability of the transmission member 12 and the housing 11, and at the same time ensuring the synchronous rotation of the transmission member 12 and the output end of the driving member 110.

The present application also provides a robot, as shown in FIG. 9 and FIG. 10, the robot includes a main body 200 and two driving wheels 100.

The main body 200 is provided with a control component 210.

The two driving wheels 100 are respectively provided on opposite sides of the main body 200; the driving member 110 of the driving wheel 100 is electrically connected to the control component 210; the wall of the accommodating groove 1*a* of the driving wheel 100 and the main body 200 are enclosed to form an accommodating chamber, and the supporting base 3 of the driving wheel 100 is accommodated in the accommodating chamber and connected to the main body 200.

The specific structure of the driving wheel 100 refers to the above embodiments. Since the robot adopts all the technical solutions of the above embodiments, it at least has all the beneficial effects brought by the technical solutions of the above embodiments, which will not be repeated here.

The above descriptions are only embodiments of the present application, and are not intended to limit the scope of the present application. Under the inventive concept of the present application, any equivalent structural transformations made by using the contents of the description and drawings of the present application, or direct/indirect applications in other related technical fields are included in the scope of the present application.

What is claimed is:

1. A rotating wheel apparatus, comprising:

a rotating assembly provided with an accommodating groove;

a bearing accommodated in the accommodating groove and connected to the rotating assembly; and a supporting base close to a notch of the accommodating groove, wherein the supporting base is connected to the bearing, so that the rotating assembly is rotationally connected to the supporting base;

wherein the rotating assembly is further provided with a friction belt, an outer periphery of the rotating assembly is provided with a mounting groove, and the friction belt is provided in the mounting groove and partially extends out of the mounting groove.

2. The rotating wheel apparatus of claim 1, wherein the rotating assembly comprises:

a housing provided with the accommodating groove; and a transmission member provided in the accommodating groove and located between the housing and the supporting base;

wherein the transmission member is connected to the bearing, and the transmission member is detachably connected to the housing.

3. The rotating wheel apparatus of claim 2, wherein the supporting base and the transmission member are respectively connected to both sides of the bearing, and a supporting portion is provided on one side of the supporting base facing the transmission member, an inner ring of the bearing is sleeved on the supporting portion, and the inner ring and the supporting portion are locked by a first locking member; and one side of the transmission member facing the supporting base is provided with a transmission portion, the transmission portion is sleeved on the outer ring of the bearing, and the outer ring and the transmission portion are locked by a second locking member.

4. The rotating wheel apparatus of claim 3, wherein a first limiting portion is provided on an outer periphery of the supporting portion, and one side of the inner ring facing the supporting base is abutted against the first limiting portion; and the supporting portion is provided with a first mounting hole, one end of the first locking member is abutted against one side of the inner ring away from the first limiting portion and one side of the supporting portion facing the transmission member, the other end of the first locking member is inserted into the first mounting hole to lock the supporting portion and the inner ring.

5. The rotating wheel apparatus of claim 3, wherein one side of the transmission portion facing the bearing is provided with a second limiting portion, and one side of the outer ring facing the transmission member is abutted against the second limiting portion; and the transmission portion is provided with a second mounting hole, one end of the second locking member is abutted against one side of the outer ring away from the second limiting portion and one side of the transmission portion facing the supporting base, and the other end of the second locking member is inserted in the second mounting hole to lock the transmission portion and the outer ring.

6. The rotating wheel apparatus of claim 2, wherein a wall of the accommodating groove is provided with a hook, the hook and the wall of the accommodating groove are enclosed to form a limiting groove, and the transmission member is partially limited in the limiting groove.

7. The rotating wheel apparatus of claim 6, wherein a clamping portion is provided on an outer periphery of the transmission member, the clamping portion is located in the limiting groove, one side of the clamping portion facing the housing is provided with an inclined surface, one side of the clamping portion away from the housing is abutted against the hook, and one side of the transmission member away from the supporting base is abutted against and fitted with the wall of the accommodating groove.

8. The rotating wheel apparatus of claim 2, wherein the transmission member is provided with a plurality of positioning holes, the wall of the accommodating groove is provided with a plurality of positioning columns, and each of the positioning columns is inserted into the positioning hole.

9. The rotating wheel apparatus of claim 2, wherein a third mounting hole is provided on an edge of the supporting base, and a projection of the transmission member on the supporting base is located on one side of the third mounting hole close to a center line of the supporting base.

10. The rotating wheel apparatus of claim 2, wherein the supporting base is located in the accommodating groove, and the notch of the accommodating groove extends to one side of the supporting base away from the transmission member.

11. The rotating wheel apparatus of claim 1, further comprising:

a counterweight provided on the supporting base.

12. A driving wheel, comprising:

the rotating wheel apparatus of claim 1, wherein the supporting base of the rotating wheel apparatus is provided with a first assembly hole; and a driving member, wherein the driving member is provided in the first assembly hole, and an output end of the driving member is connected to the rotating assembly of the rotating wheel apparatus.

13. A robot, comprising:

a main body provided with a control component; and two driving wheels of claim 12, wherein the two driving wheels are respectively provided on opposite sides of the main body;

wherein the driving member of the driving wheel is electrically connected to the control component; and the wall of the accommodating groove and the main body are enclosed to form an accommodation chamber, and the supporting base of the driving wheel is accommodated in the accommodation cavity and connected to the main body.

* * * * *